(12) United States Patent
D'Epiro (10) Patent No.: US 12,264,611 B2
(45) Date of Patent: Apr. 1, 2025

(54) EXHAUST GAS AFTER-TREATMENT DEVICE AND PROPULSION SYSTEM INCLUDING THE DEVICE

(71) Applicant: FPT INDUSTRIAL S.P.A., Turin (IT)

(72) Inventor: Clino D'Epiro, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 18/692,365

(22) PCT Filed: Sep. 22, 2022

(86) PCT No.: PCT/IB2022/058968
§ 371 (c)(1),
(2) Date: Mar. 15, 2024

(87) PCT Pub. No.: WO2023/052915
PCT Pub. Date: Apr. 6, 2023

(65) Prior Publication Data
US 2024/0328336 A1    Oct. 3, 2024

(30) Foreign Application Priority Data
Sep. 28, 2021   (IT) .................... 102021000024809

(51) Int. Cl.
*F01N 3/20*     (2006.01)
*B01D 53/94*    (2006.01)
*F01N 3/021*    (2006.01)
*F01N 3/10*     (2006.01)

(52) U.S. Cl.
CPC ........... *F01N 3/2066* (2013.01); *F01N 3/021* (2013.01); *F01N 3/101* (2013.01); *B01D 53/9418* (2013.01); *B01D 53/9422* (2013.01); *B01D 53/9445* (2013.01); *F01N 3/103* (2013.01); *F01N 3/106* (2013.01); *F01N 3/206* (2013.01);
(Continued)

(58) Field of Classification Search
CPC combination set(s) only.
See application file for complete search history.

(56) References Cited

U.S. PATENT DOCUMENTS 6,973,776 B2 * 12/2005 van Nieuwstadt .... F01N 3/0842
60/303
11,073,057 B2 * 7/2021 Joo ........................ F01N 3/2066
(Continued)

FOREIGN PATENT DOCUMENTS

EP    3369898 A1    9/2018
WO    2019043557 A1    3/2019

OTHER PUBLICATIONS

Samantha Jones, Ceria Based Catalysts for Low Temperature NOx Storage and Release, Theses and Dissertations—Chemistry, 2016, pp. 1-146.
(Continued)

*Primary Examiner* — Binh Q Tran
(74) *Attorney, Agent, or Firm* — Bayramoglu Law Offices LLC (57) ABSTRACT

A Diesel engine and an exhaust gas after-treatment device operatively associated with an exhaust manifold of the Diesel engine, the after-treatment device comprising in succession a Barium-loaded three-way catalyst, an antiparticulate filter and a selective reducing catalyst equipped with a relative dosing device of urea-based reducing agent.

8 Claims, 5 Drawing Sheets

(52) U.S. Cl.
CPC ...... *F01N 2560/06* (2013.01); *F01N 2610/02* (2013.01); *F01N 2900/1602* (2013.01)

(56) References Cited

U.S. PATENT DOCUMENTS

| | | | | |
|---|---|---|---|---|
| 2004/0144083 | A1* | 7/2004 | Ament | F01N 3/0253 60/301 |
| 2006/0053772 | A1* | 3/2006 | Dou | F01N 3/0885 60/285 |
| 2010/0242448 | A1* | 9/2010 | Mital | F01N 3/2033 60/276 |
| 2015/0047323 | A1* | 2/2015 | Beaver | F01N 3/2803 60/299 |
| 2015/0238902 | A1* | 8/2015 | Nagaoka | F01N 13/0093 422/111 |
| 2016/0158700 | A1* | 6/2016 | Qi | B01J 37/0246 502/64 |
| 2017/0284250 | A1* | 10/2017 | Bergeal | F01N 3/2006 |
| 2018/0347432 | A1* | 12/2018 | Dutto | F01N 3/035 |
| 2020/0248604 | A1 | 8/2020 | Joo et al. | |
| 2020/0309003 | A1* | 10/2020 | Miyairi | F01N 9/002 |
| 2022/0282650 | A1* | 9/2022 | Bergeal | F01N 3/2066 |

OTHER PUBLICATIONS

Yuichiro Murata, et al., NOx Trap Three-Way Catalyst (N-TWC) Concept: TWC with NOx Adsorption Properties at Low Temperatures for Cold-Start Emission Control, SAE International Journal of Fuels and Lubricants, 2015, pp. 454-459, vol. 8.

* cited by examiner

EXHAUST GAS AFTER-TREATMENT DEVICE AND PROPULSION SYSTEM INCLUDING THE DEVICE

CROSS REFERENCE TO RELATED APPLICATIONS

This application is the national phase entry of International Application No. PCT/IB2022/058968, filed on Sep. 22, 2022, which is based upon and claims priority to Italy Patent Application No. 102021000024809, filed on Sep. 28, 2021, the entire contents of which are incorporated herein by reference.

TECHNICAL FIELD

The present invention relates to the field of exhaust gas after-treatment systems and in particular to the field of Diesel cycle engines.

BACKGROUND

Spark ignition engines are generally equipped with a device for the reduction of pollutants contained in the exhaust gases referred to as a "three-way catalyst" and with the acronyms TWC or 3WC from the Anglo-Saxon language. It exploits the combustion oscillation around the stoichiometric ratio to reduce the pollutants produced by the related internal combustion engine.

Diesel cycle engines are generally equipped with an exhaust gas after-treatment device (ATS) which includes
- a Diesel DOC catalyst,
- a DPF (Diesel Particulate Filter) and
- a selective reduction catalyst SCR (Selective Catalytic Reduction) designed to reduce NOx by injecting, upstream of the catalyst itself, a reducing agent based on urea.

It is known that one of the fundamental drawbacks of these systems is the rapid achievement of the SCR operating temperature, as below this temperature, the SCR is inoperative. More specifically, the injection of urea-based reducing agent cannot be performed, because otherwise, lacking a thermal content such as to allow hydrolysis, it would lead to solid deposits formation that would soon clog the SCR.

Several systems were presented to accelerate the warming of the SCR.

Some solutions involve the use of NOx accumulators called NOx Storage Catalyst NSC to accumulate NOx, that cannot be converted by the SCR, while it reaches the operating temperature.

In the NSC, nitrogen oxides are stored as they react with the basic components to form nitrates.

The first step of the storage mechanism is the oxidation of NO to NO2 on the precious metals of the catalyst, mainly Platinum (Pt). This NO2 is subsequently stored on the corresponding storage materials, eg. Barium Carbonate (BaCO3) incorporated in the catalyst formulation while the target storage capacity is reached.

The NSC works in a non-continuous way, i.e. it needs to be regenerated periodically by means of exhaust gases rich in hydrocarbons ($\lambda<1$) to decompose the nitrates and reduce them. The main reducing agents are carbon monoxide (CO) and hydrogen (H2), which are formed during rich combustion in the cylinder or directly on the catalyst.

If not specifically excluded in the detailed description below, what is described in this chapter is to be considered as an integral part of the detailed description.

SUMMARY

The object of the present invention is to present an ATS dedicated to Diesel engines at least alternative to known ATSs.

The basic idea of the present invention is to replace the DOC with a modified TWC and to adequately control the behavior of the internal combustion engine as a function of the operating temperature of the SCR.

In other words, the classic DOC+DPF+SCR configuration is changed to the TW_NSC+DPF+SCR configuration.

The "+" symbol identifies a cascade interconnection.

In particular, according to the present invention, the TWC is modified by adding barium in the formulation of the catalyst, such as to also function as an NSC.

In cold starts of the Diesel engine, the introduction of fuel into the engine is carried out in such a way as to obtain a stoichiometric ratio between air and fuel ($\lambda=1$). This fact brings the following advantages:
- low NOx formation in the diesel engine exhaust manifold,
- rapid heating of the TWC which rapidly begins to reduce HC and NOx.

Meanwhile, the excess particulate, typical of stoichiometric combustion or in lack of oxygen, is accumulated in the DPF.

When the temperature at the TWC inlet exceeds a first temperature threshold (about 220°), such as to make operational the TWC's NOx accumulation function, the engine fuel supply is controlled in such a way as to make lean ($\lambda>1$) the mixture with cyclic regeneration intervals, in which the mixture is rich ($\lambda<1$).

In these regeneration intervals, the functionalities of the TWC are such as to neutralize a good part of the NO2 released by the Barium loading and the remaining part of the NO2 oxidizes the particulate accumulated in the DPF, realizing a spontaneous regeneration of the same. Furthermore, under such conditions, the TWC produces ammonia as a by-product, which ends up loading the SCR disposed downstream, so that the SCR begins to function as a passive SCR, despite the injection of urea-based reducing agent being still inhibited.

Once a second temperature threshold (about 230°) at the inlet of the SCR has been exceeded, higher than the first temperature threshold and time-delayed due to the thermal inertia of the SCR and the DPF that precedes it, the NOx accumulation functionality by the TWC gradually reduces and therefore the cyclic regenerations are interrupted in favor of the injection of urea into the appropriate doser. This implies that the engine is always supplied with a lean mixture ($\lambda>1$).

Under these conditions, the TWC behaves similarly to a DOC producing NO2 useful for the passive and continuous regeneration of the DPF while, at the same time, the SCR is active and able to neutralize NOx by means of a specially injected urea-based reducing agent.

Advantageously, the Barium enriched TWC is a device known per se and used in combination with controlled ignition internal combustion engines fed with lean mixture rather than in stoichiometric conditions.

A preferred variant of the invention provides that at least the TW_NSC loaded with Barium is arranged upstream of a turbine arranged to supercharge the internal combustion engine.

Since the turbine subtracts energy content from the exhaust gases, the first and second operating phases begin very early after the engine is switched on, while, the SCR is arranged downstream of the turbo in a flow with a lower energy content than that which enters the TW_NSC. So that the operating time window in which the TW_NSC works as NSC widens approaching the instant the engine is switched on. When the third operational phase begins, the TW_NSC, working as an NSC, still has an efficiency >90%, although it decreases with temperature increase. At the same time, the efficiency of the SCR is growing as the temperature rises and has a sufficiently high efficiency to gradually replace the TW_NSC in reducing NOx.

The dependent claims describe preferred variants of the invention, forming an integral part of this description.

BRIEF DESCRIPTION OF THE DRAWINGS

Further objects and advantages of the present invention will become clear from the following detailed description of an example of its embodiment (and its variants) and from the attached drawings given purely for explanatory and non-limiting purposes, in which.

The same reference numbers and letters in the figures identify the same elements or components or functions.

It should also be noted that the terms "first", "second", "third", "upper", "lower" and the like can be used here to distinguish various elements. These terms do not imply a spatial, sequential or hierarchical order for the modified elements unless specifically indicated or inferred from the text.

The elements and features illustrated in the various preferred embodiments, including the drawings, can be combined with each other without however departing from the scope of this application as described below.

DETAILED DESCRIPTION OF THE EMBODIMENTS

All the figures show an Diesel combustion engine E, hereinafter referred to simply as the "engine" connected to an intake line IP and an exhaust line OP.

The large solid arrow indicates the exhaust gas that is released into the environment through the exhaust line, while the empty arrow indicates the fresh air introduced into the engine by means of the intake line.

The ATS is arranged along the exhaust line, that is, the set of devices for abatement of pollutants produced by the engine.

According to all the variants, the first device that the exhaust gas encounters along the exhaust line is the TWC loaded with Barium and therefore indicated as TW_NSC. It performs all the functions of a TWC and in addition is able, under certain operating conditions, to store NOx as an NSC.

Downstream of the TW_NSC there is a DPF, then an SCR with a relative dosing module D for the injection of urea-based reducing agent and preferably also a CUC with the Anglo-Saxon acronym "Clean Up Catalyst" which has the purpose of neutralizing the excess ammonia released by the SCR, as ammonia is counted in the same way as all other pollutants emitted by the propulsion system.

At least one injector J is associated with the engine for injecting diesel fuel in it.

In some applications, the SCR functionality can also be partially integrated into the DPF, defining a so-called SCR on Filter, generally indicated by the acronym SCRoF.

In order to control the air/fuel ratio $\lambda$ without varying the fuel delivered by the engine, it is necessary to have a valve TVA located at the intake manifold, similar to a throttle valve implemented in positive ignition engines or other equivalent means capable of to reduce the air flow as a valve opening phase variator, generally indicated by the acronym VVT or VVA.

Figure 1:
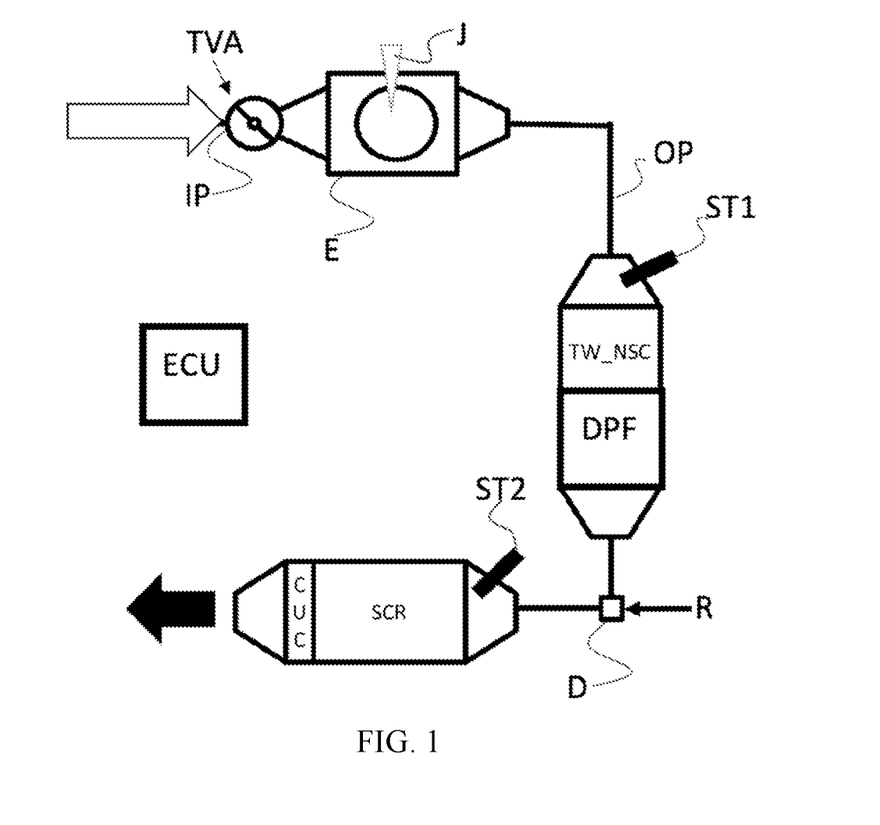
FIG. 1 shows a first propulsion system scheme according to a first preferred variant of the invention.
Figure 2:
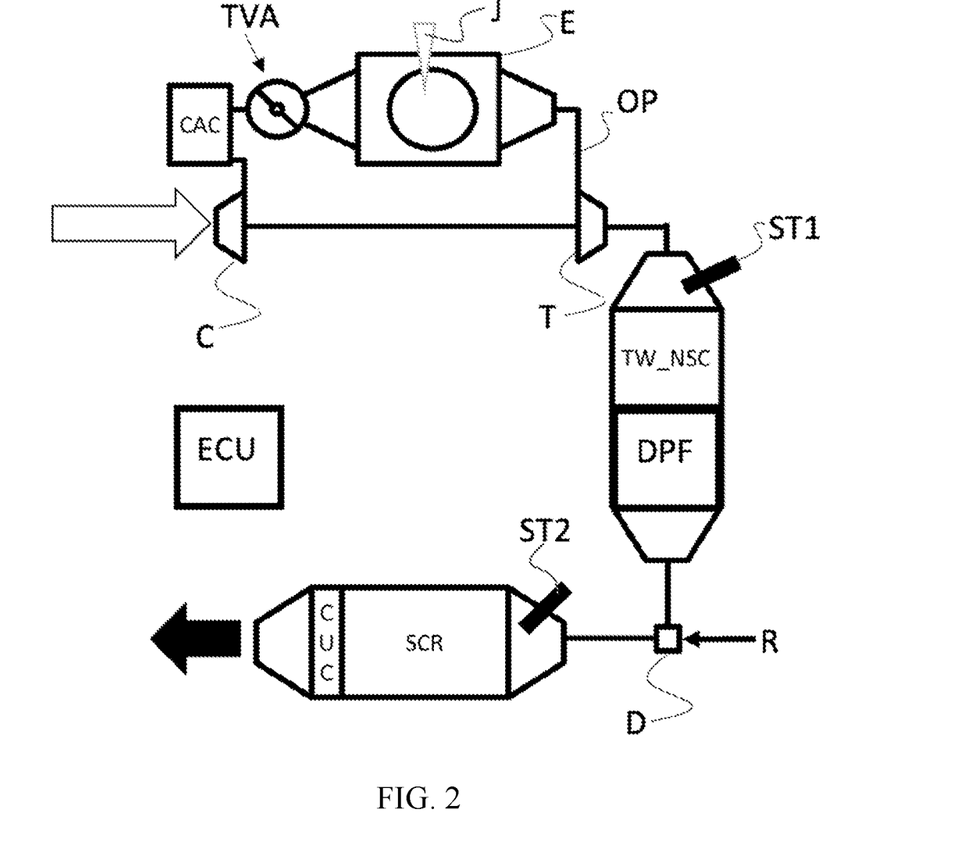
FIGS. 2-4 show further diagrams of the propulsion system according to as many preferred variants of the invention.
Figure 3:
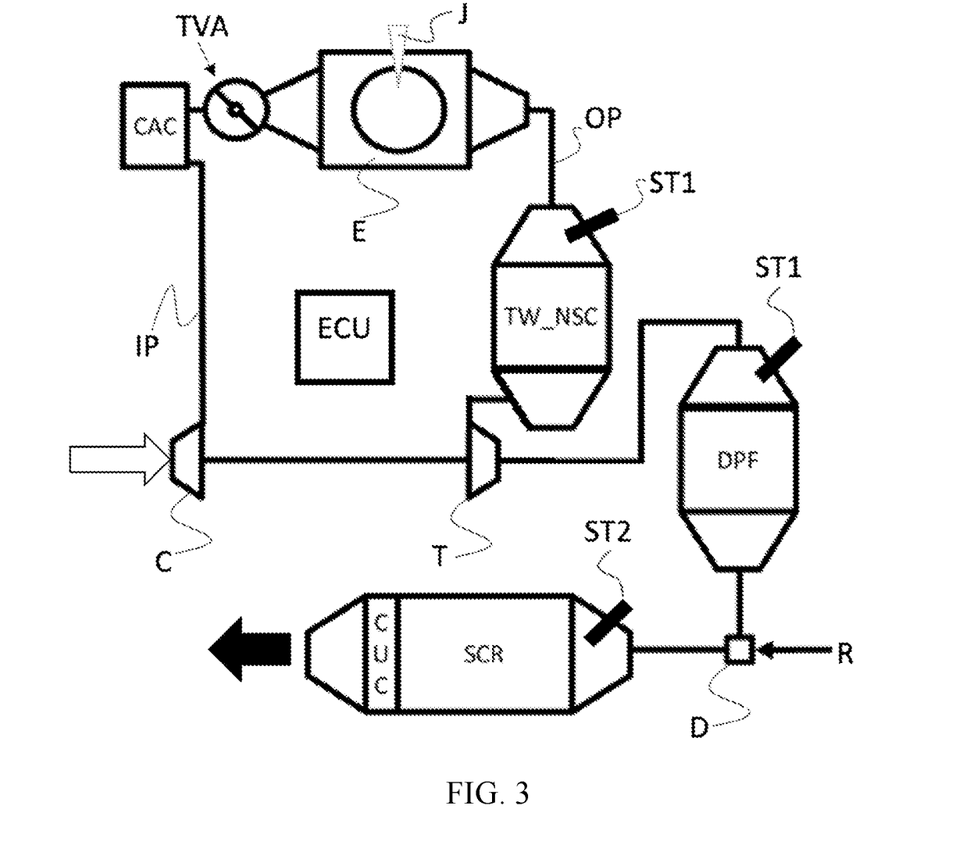
Figure 4:
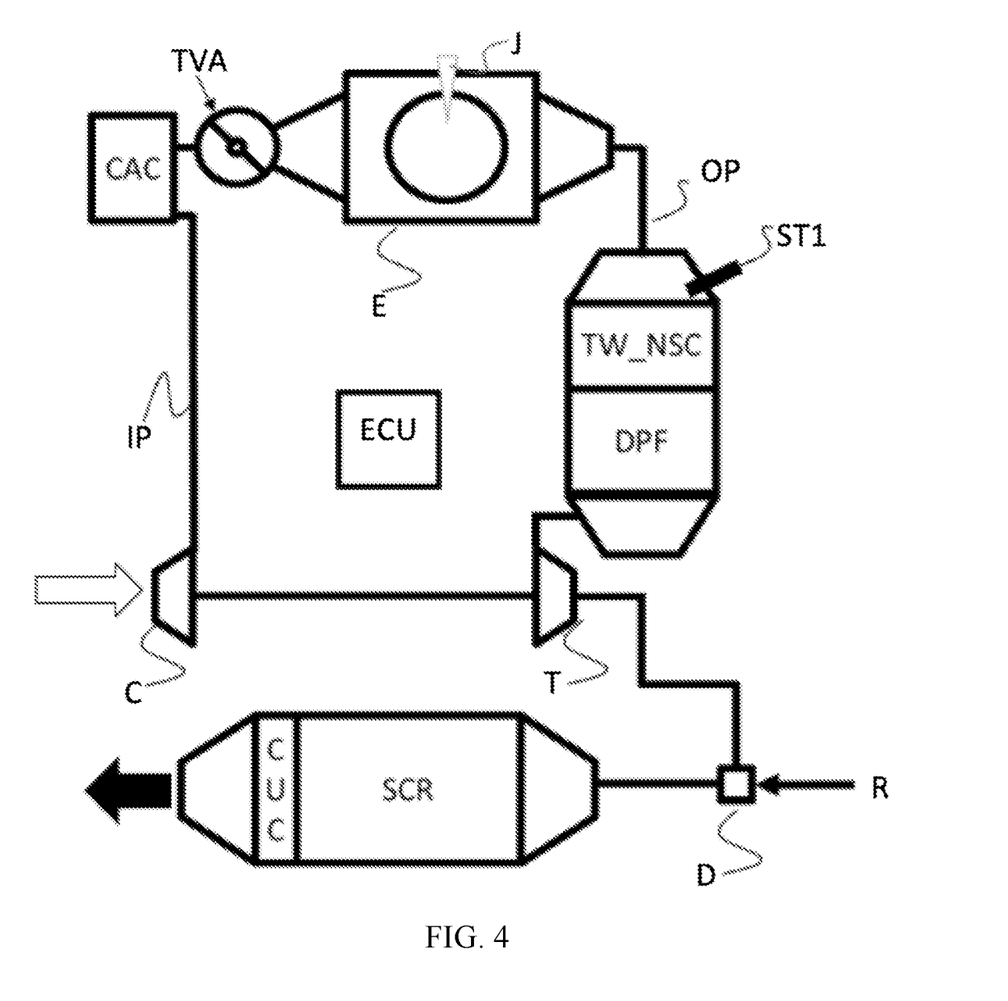

FIGS. 2-4 differ from FIG. 1 by the presence of a TC turbo-compressor. In particular, the turbine T is arranged on the discharge line and rotates the compressor C arranged on the suction line.

The positioning of the turbine differentiates the variants of FIGS. 2-4. In FIG. 2, the turbine is arranged upstream of the TW_NSC. In FIG. 3, the turbine is arranged between the TW_NSC and the DPF, while in FIG. 4 the turbine is arranged between the DPF and the dosing module D of the SCR.

The positioning of the turbine affects the temperatures variation on the devices that define the ATS during the heating of the ATS itself.

Figure 5:
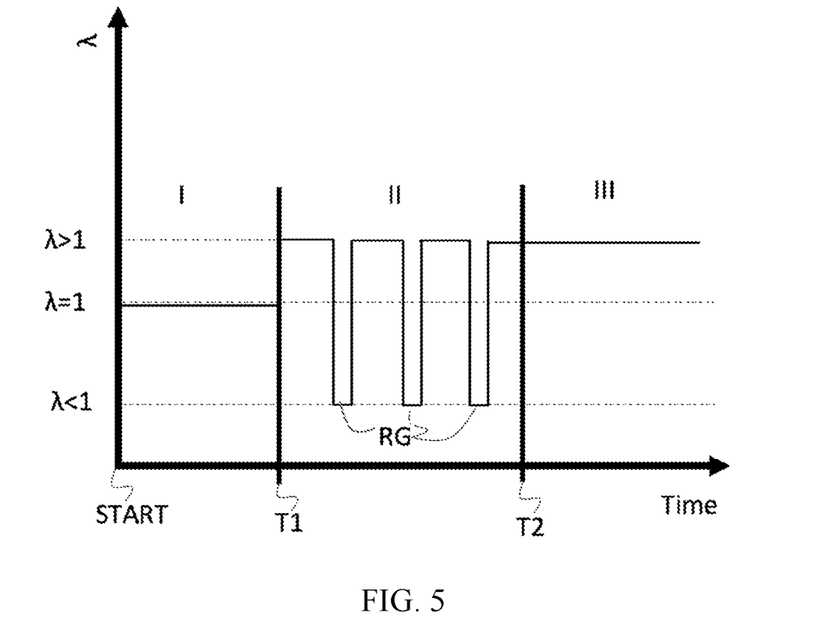
FIG. 5 shows an exemplary diagram of the fuel supply control of the internal combustion engine as a function of exceeding the temperature thresholds measured on predetermined components of the ATS.

FIG. 5 shows a timing diagram of the engine fuel supply control as the temperature varies of some of the devices that define the ATS.

Symbols T1 and T2 indicate events in which the temperatures measured respectively at TW_NSC and SCR, respectively exceed with T1 and T2 temperature thresholds indicated, for convenience, with the same signs.

A second temperature sensor ST2 is operationally associated with the SCR to monitor its temperature.

Upon exceeding the second temperature threshold T2 it is considered that the SCR is efficient and therefore
the mixture administered to the engine is kept stably lean and
the valve TVA is kept completely open and
the injection of reducing agent based on urea R begins using the dispenser D.

The contribution from the scheme object of the present invention is to be sought in the phases preceding the achievement of the temperature threshold T2 at the SCR.

From the cold start of the engine, indicated with TO in FIG. 5, the fuel supply of the same is controlled in such a way as to administer a stoichiometric mixture, =1, so as to favor, with the high combustion temperatures, the heating of the engine and of the ATS.

In order to administer a stoichiometric or rich mixture, the valve TVA is controlled in such a way as to throttle the intake manifold compensating with the suction losses the greater torque induced by the introduction of the stoichiometric or rich mixture.

Upon reaching the first temperature threshold T1 at TW_NSC, it is considered that the storage function of this device is efficient, therefore, the fuel supply to the engine is controlled in order to administer a lean mixture, >1 with cyclical regenerations of the TW_NSC performed by enriching the mixture ≤≤1. With lean fuel supply, the throttling of the valve TVA is reduced or canceled.

According to a preferred variant of the invention, the regeneration time is between 1% and 30% of the time in which the engine is supplied with lean mixture. For example, every 10 minutes of lean-mix operation, a regeneration of approximately 2 minutes is performed. Preferably, the regeneration time is adjusted in real time to the amount of accumulated Nox, estimated by a model and/or with the help of specific sensors per se known.

A first temperature sensor ST1 is operatively associated with the TW_NSC to monitor its temperature.

The regenerations involve an enrichment of the mixture such that $\lambda \leq 1$. In FIG. 5, the regenerations are performed with a significant enrichment of the mixture such as to result in $\lambda < 1$.

In the T0-T1 interval, the TW_NSC works like any TWC under the same operating conditions. In this phase, the particulate generated, due to the stoichiometric feeding, accumulates in the DPF.

In the T1-T2 interval, the TWC continues to operate as a TWC which, however, also has NO2 storage capacity as an NSC.

In the same interval, during regenerations RG, the enrichment of the mixture involves:
the release of NO2 of which part is catalyzed by the active layers of the TWC and part contributes to eliminating the particulate previously accumulated in the DPF and
the generation of ammonia that passively activates the SCR arranged downstream of the DPF.

If the turbine is arranged upstream of the TW_NSC, this means that the first phase identified by the interval T0-T1 is relatively larger, in terms of time, than the situation in which the turbine is arranged downstream of the TW_NSC.

In fact, the thermal content subtracted from the turbine slows down the heating of the TW_NSC.

For this reason, it is considered that the embodiment of FIG. 3 is better than the solution of FIG. 2.

It is known that when the engine is warming up, it is more advantageous to reduce the supercharging of the same.

The arrangement, upstream of the turbine, of several ATS devices, involves a lower contribution from the cold turbocharger which favors the heating of the engine and therefore of the ATS devices arranged on the related exhaust line.

Therefore, the solution shown in FIG. 4 is an improvement in terms of speed by the ATS to reach the best operating conditions, but is detrimental in terms of the performance of the turbocharger and therefore of the entire propulsion system.

Preferably, according to all the embodiments shown here, a cooler CAC is arranged between the intake manifold and the compressor, which has the purpose of cooling the air compressed by the compressor C by improving the filling of the cylinders of the engine E.

An ECU processing unit is configured to acquire the temperature signals generated by sensors TS1 and TS2 and to control the fuel supply means TVA and J described above, in order to achieve the aforementioned three fuel supply phases of the engine E.

It is worth highlighting that further regenerations RG can be foreseen even after the SCR reaches the second temperature threshold.

Observing FIG. 5, this is equivalent to shifting the straight line indicative of the value T2 to the left.

Vanadium-based SCRs (V2O5) have an optimum operating temperature between 300° and 450° C. The Fe-zeolite-based SCRs have an optimal operating temperature between 350° C.-600° C., while the CR-zeolite-based SCRs have an optimal operating temperature between 150° and 450° C.

Even when implementing an SCR that starts working at a temperature of 150° C., it is necessary to consider that the turbine is located upstream of it, which causes a reduction in the temperatures of the exhausted gases by about 150° C. In addition, the TW_NSC and the DPF are also arranged with their respective thermal inertias. The TW_NSC and the DPF have their own thermal inertia that must be overcome to provide sufficient heat to activate the SCR.

Therefore, even if the temperature threshold T2 were equal to or lower than the temperature threshold T1, the different measurement point of the same generates the time windows shown in FIG. 5 which delimit the first, second and third operating phases.

Since temperatures are measured at different points on the ATS, there is no relationship between T1 and T2, as T1 can be >, < or =a T2. Therefore, the three steps of the procedure shown in FIG. 5 are in the time domain rather than the temperature domain.

Figure 6:
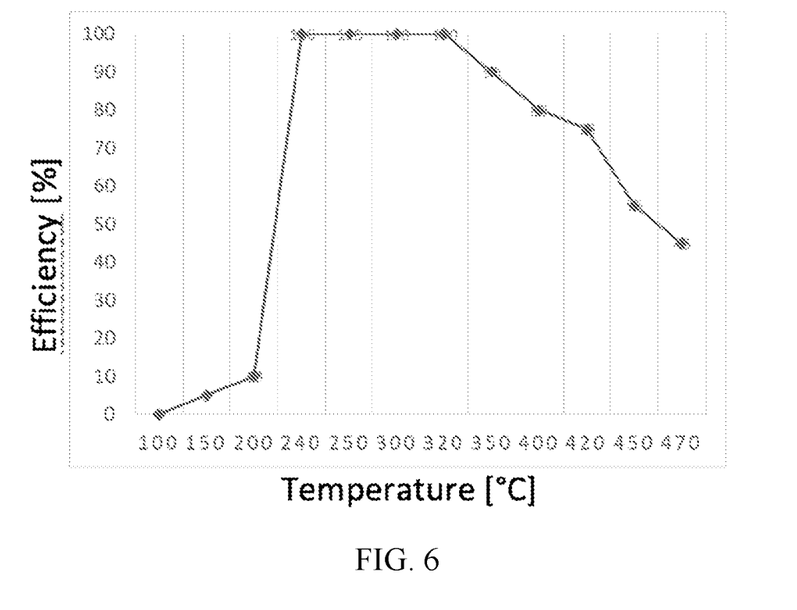
FIG. 6 shows an efficiency diagram of a Barium loaded device acting as an NSC.

In other words, even if the TW_NSC and SCR operating windows overlap in a temperature diagram like the one shown in FIG. 6, it is necessary to consider the different positioning of the components along the exhaust line and the heat subtracted from the hydrolysis of the urea-based reducing agent. This process of hydrolysis of the urea-based reducing agent alone can lower the temperature of the exhaust gas flow by 25-30° C.

The temperature thresholds T1 and T2 can be appropriately chosen to obtain a compromise.

For example, an excessively low temperature threshold T1 leads to fuel savings, but slow the ATS dynamics to achieve an optimal overall efficiency.

An excessively low T2 temperature threshold entails the risk of releasing NO2 before the SCR is efficient. On the other hand, an excessively high T2 temperature threshold entails the risk of reaching the decreasing portion of the efficiency curve of the NSC function of the TWC with the SCR kept in passive conditions and therefore unable to adequately convert the NO2 released by the NSC and not converted by the TWC function.

When also the second T2 temperature threshold is widely exceeded, the TW_NSC begins to behave more and more like a DOC, as the temperature rises, able to cooperate with the SCR in reducing NOx. This fact is particularly advantageous, since the injection of urea-based reducing agent can be suitably controlled according to the efficiency of the TW_NSC's ability to convert the NO generated by the engine into NO2. Indeed, the SCR needs an optimal NO/NO2 ratio to function properly.

The present invention can be advantageously carried out by means of a computer program, which comprises coding means for carrying out one or more steps of the method, when this program is executed on a computer. Therefore, it is intended that the scope of protection extends to said computer program and further to computer readable means comprising a recorded message, said computer readable means comprising program coding means for carrying out one or more steps of the method, when said program is run on a computer.

Implementation variants are possible to the non-limiting example described, without however departing from the scope of protection of the present invention, including all the equivalent embodiments for a person skilled in the art, to the content of the claims.

From the above description, the person skilled in the art is able to realize the object of the invention without introducing further construction details.

What is claimed is:

1. An exhaust gas after-treatment device comprising a barium-loaded three-way catalyst, an anti-particulate filter and a selective reducing catalyst-equipped with a relative doser of urea-based reducing agent, wherein the barium-loaded three-way catalyst is arranged upstream of the exhaust gas filter-after treatment device and the antiparticle filter and the selective reducing catalyst-equipped with the relative doser of urea-based reducing agent are arranged downstream of the exhaust gas filter after-treatment device.

2. A propulsion system comprising a diesel engine and an exhaust gas after-treatment device operatively associated with an exhaust manifold of the diesel engine, the after-treatment device comprising in succession a barium-loaded three-way catalyst, an anti-particulate filter and a selective reducing catalyst equipped with the relative doser of urea-based reducing agent, wherein the barium-loaded three-way catalyst is arranged upstream of the exhaust gas filter-after treatment device and the antiparticle filter and the selective reducing catalyst-equipped with the relative doser of urea-based reducing agent are arranged downstream of the exhaust gas filter after-treatment device.

3. The system according to claim 2, further comprising
feeding means for controlling an air/fuel ratio of a mixture introduced into the diesel engine,
a first temperature sensor arranged to measure a temperature at the three-way catalyst,
a second temperature sensor arranged to measure a temperature at the selective reduction catalyst, and
a processing means configured to control a supply means on the basis of temperature values measured by the first and second temperature sensors.

4. The system according to claim 3, wherein the processing means, during the heating of the after-treatment device, are configured for
carrying out a first operating phase, by controlling a stoichiometric fuel supplying of the engine in cold starting conditions, while a first temperature threshold is reached, measured by means of the first temperature sensor,
carrying out a second operating phase, by controlling a generally lean engine fuel supplying with cyclic enrichments of the mixture in order to induce regenerations of the barium-loaded three-way catalyst while reaching a second temperature threshold measured by means of the second temperature sensor, and
carrying out a third operating step, by controlling a stably lean engine fuel supplying and activating the urea-based reducing agent doser device.

5. A method for controlling a fuel supply of a propulsion system comprising a diesel engine and an exhaust gas after-treatment device operatively associated with an exhaust manifold of the diesel engine, the post-treatment comprising in succession a catalyst and three-way loaded with barium, an anti-particulate filter and a selective reducing catalyst equipped with a relative dispenser of reducing agent based on urea, the method comprising:

(i) stoichiometric fuel supplying the engine in cold starting conditions, while a first temperature threshold is reached, measured by means of a first temperature sensor, (ii) generally lean engine fuel supplying with cyclic enrichments of the mixture so as to induce regenerations of the barium-loaded three-way catalyst while reaching a second temperature threshold measured by means of a second temperature sensor, and (iii) stably lean feeding the engine and activation of the urea-based reducing agent doser, wherein the barium-loaded three-way catalyst is arranged upstream of the exhaust gas filter-after treatment device and the anti-particle filter and the selective reducing catalyst-equipped with the relative doser of urea-based reducing agent are arranged downstream of the exhaust gas filter after-treatment device.

6. A computer program comprising program coding means suitable for carrying out all steps (i-iii) of claim 5, when the program is run on a processing unit-configured to control a supply means on the basis of temperature values measured by the first and second temperature sensors.

7. A computer readable means comprising a recorded program, the computer readable means comprising program coding means adapted to perform all steps (i-iii) of claim 6, when the program is run on a processing unit configured to control a supply means on the basis of temperature values measured by the first and second temperature sensors.

8. An industrial or commercial vehicle comprising the propulsion system according to claim 2.

* * * * *